Figure 1:
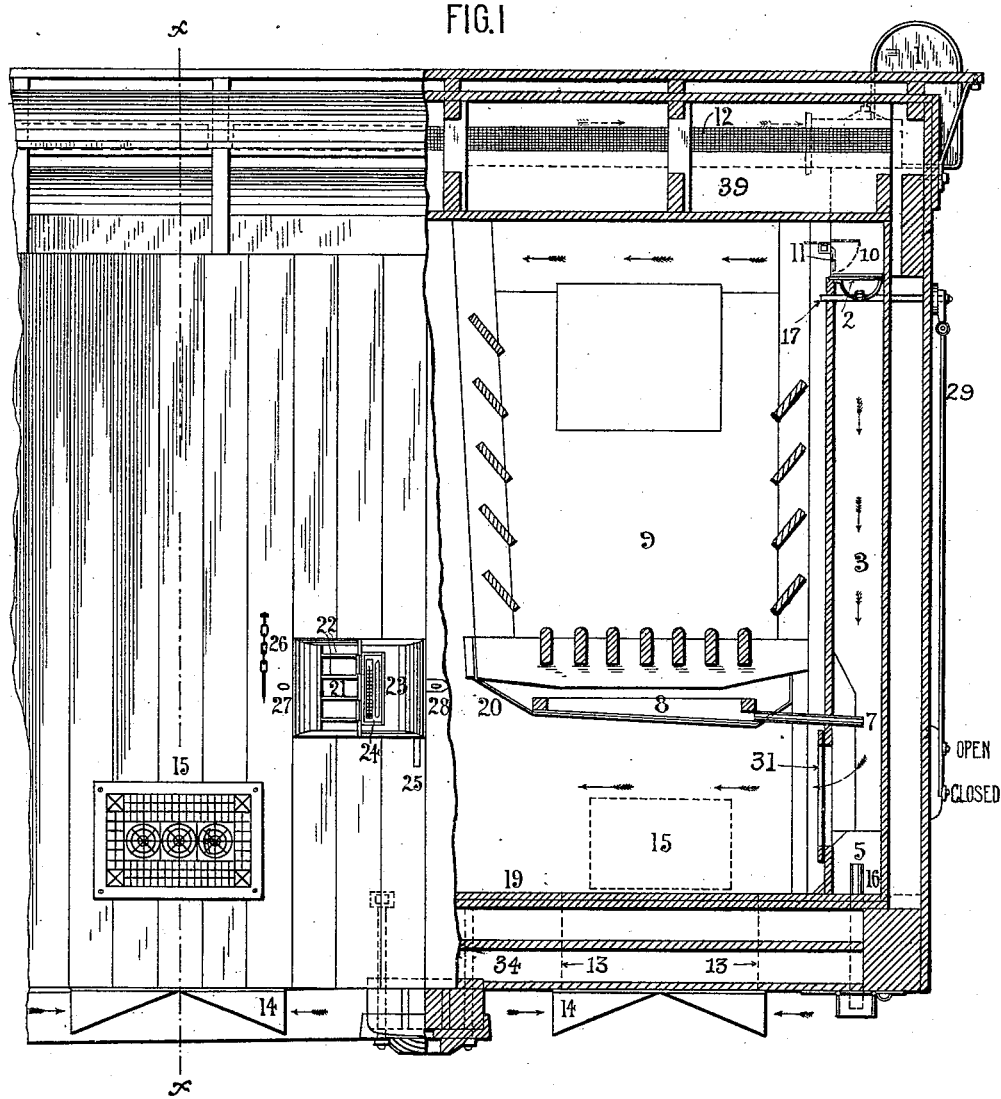

(No Model.) 6 Sheets—Sheet 1.

H. B. PLANT.
REFRIGERATOR CAR.

No. 523,374. Patented July 24, 1894.

WITNESSES
Cle Bundine
Horace A. Dodge

INVENTOR
Henry B. Plant,
BY Dodge Sons,
ATTORNEYS.

(No Model.) 6 Sheets—Sheet 4.

H. B. PLANT.
REFRIGERATOR CAR.

No. 523,374. Patented July 24, 1894.

WITNESSES
CC Burdine.
Horace A Dodge.

Henry B. Plant
INVENTOR

BY Dodge Sons
ATTORNEYS.

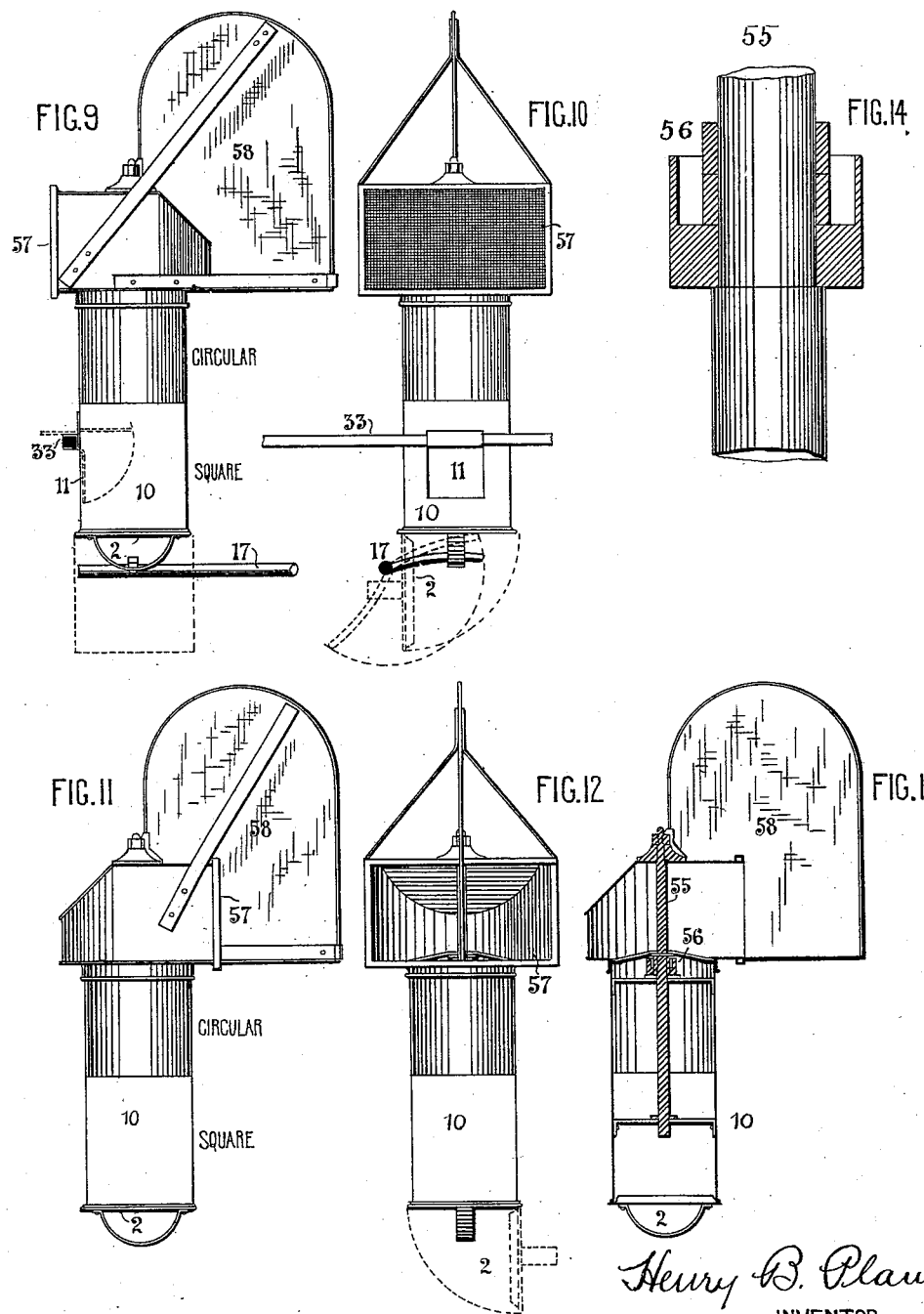

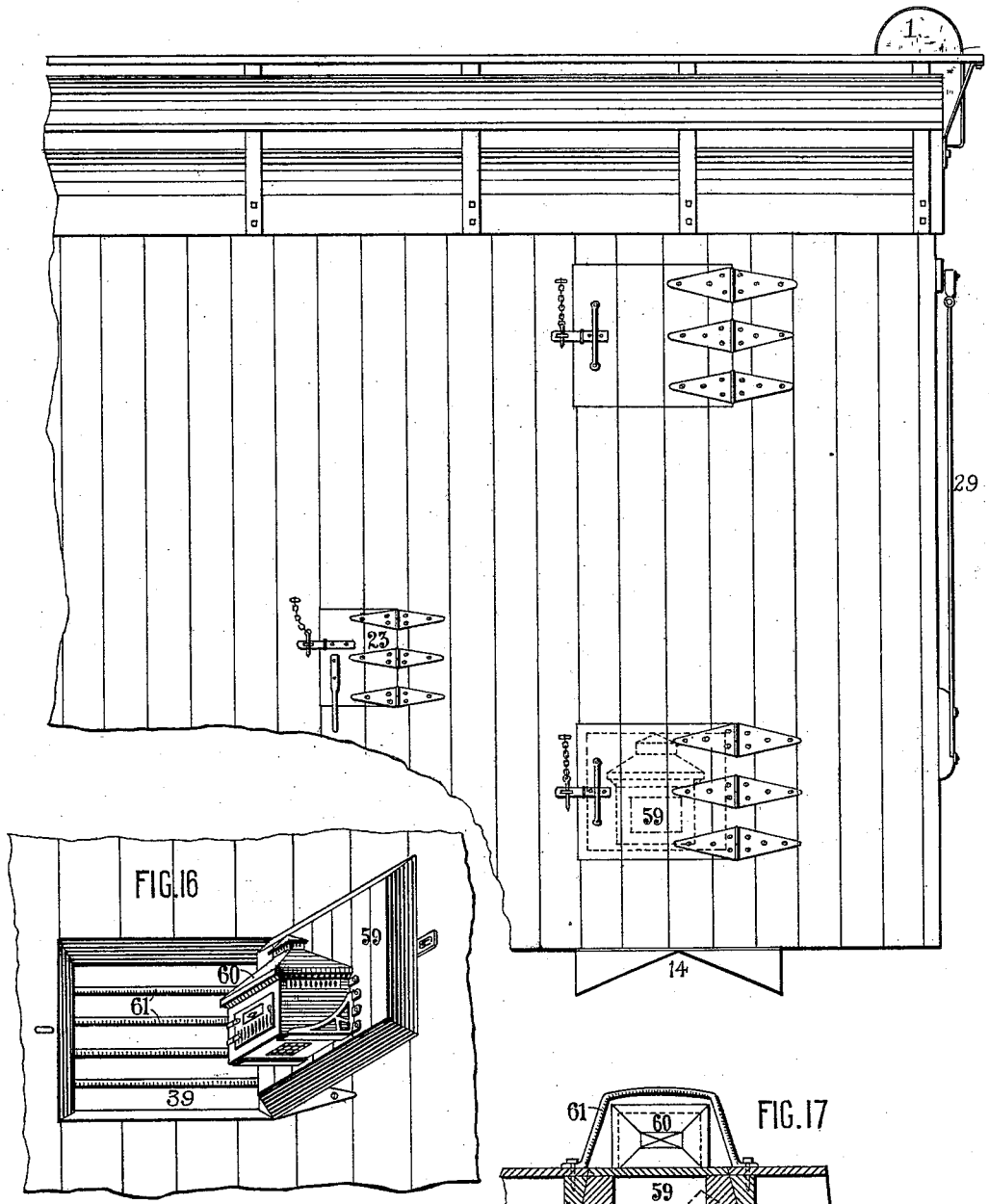

UNITED STATES PATENT OFFICE.

HENRY B. PLANT, OF NEW YORK, N. Y.

REFRIGERATOR-CAR.

SPECIFICATION forming part of Letters Patent No. 523,374, dated July 24, 1894.

Application filed December 19, 1893. Serial No. 494,057. (No model.)

*To all whom it may concern:*

Be it known that I, HENRY B. PLANT, a citizen of the United States, residing at New York, in the county of New York and State of New York, have invented certain new and useful Improvements in Refrigerator-Cars, of which the following is a specification.

My invention relates to cars designed more especially for use in transporting fruit.

The principal object of the present invention is to afford or insure a perfect and thorough ventilation of the car; but while this is desirable in warm weather or in warm climates, it must not interfere with or preclude the exclusion, when necessary, of such cold air as would freeze or injure the fruit.

Where a ventilated car travels over a restricted area there will ordinarily be no difficulty on account of changes in temperature; but where, in order to save time and labor, the same car is carried over thousands of miles, provision must be made for transforming the car almost instantly from a refrigerating or ventilating car to a heated car; otherwise the fruit passing from a warm to a frosty climate,—for instance from Florida to Pennsylvania,—will be injured and rendered practically valueless. In order, therefore, to produce a car in which a thorough ventilation may be secured, and from which also the cold air may be excluded when necessary or desirable, I adopt the construction shown in the drawings, in which—

Figure 2:
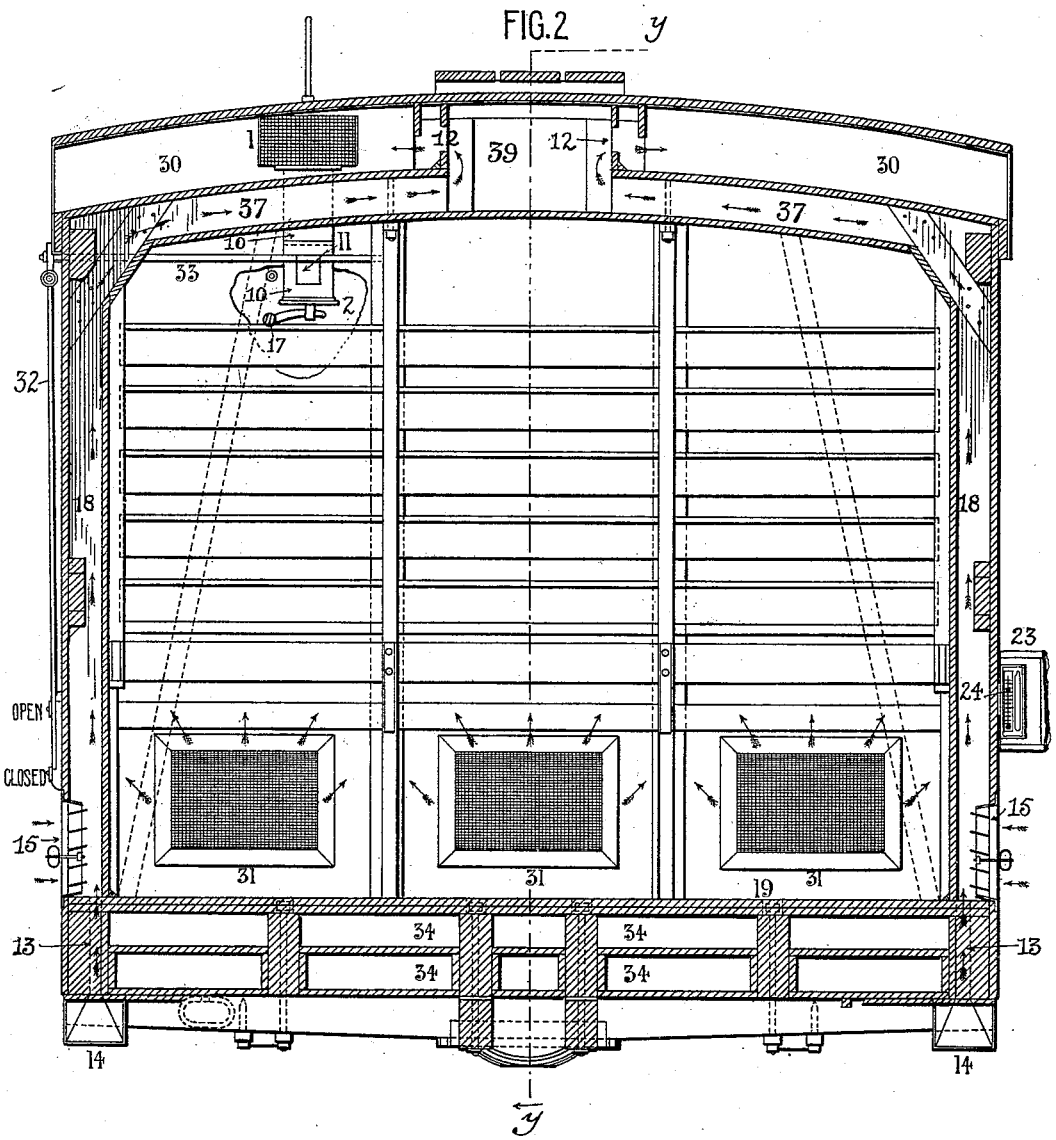
Figure 3:
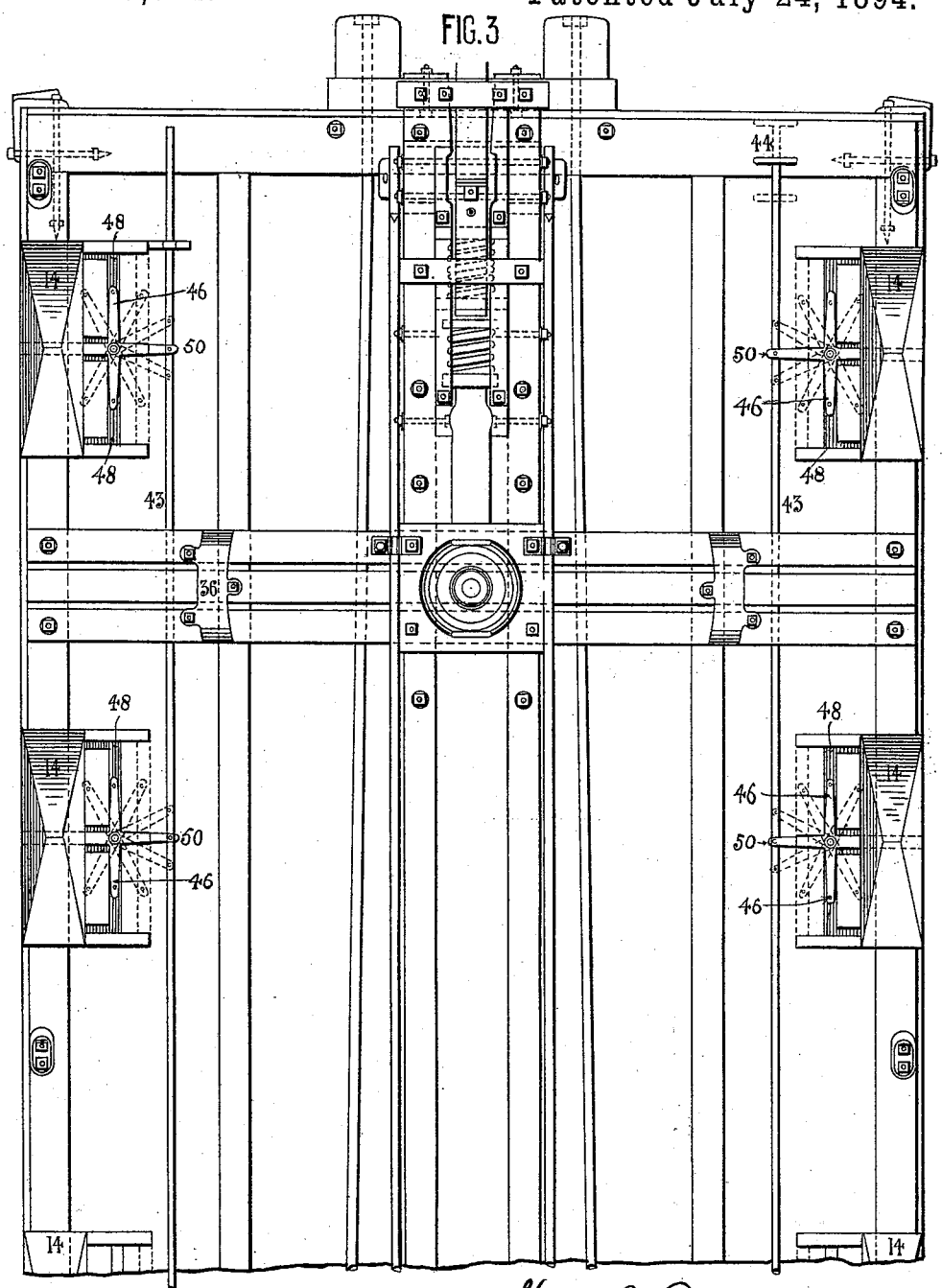
Figure 4:
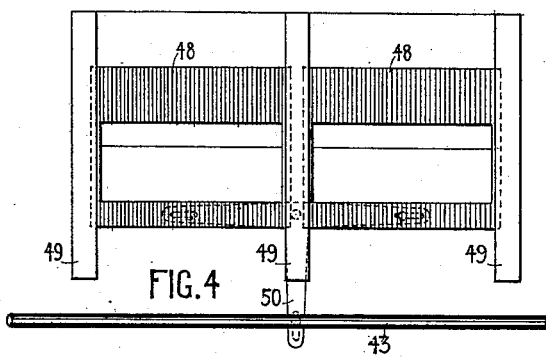

Figure 1 is a side elevation of the end of the car with a portion in section (on the line *y—y* of Fig. 2); Fig. 2, a vertical transverse sectional view on the line *x—x* of Fig. 1; Fig. 3, a bottom plan view; Figs. 4, 5, 6, 7 and 8, views illustrating the construction of the air-scoops or ventilators in the bottom of the car; Figs. 9 to 14, views illustrating the construction of the revolving roof vent; and Figs. 15 to 17, views illustrating the construction and arrangement of the heating apparatus.

The car is provided with a double or hollow-walled floor 19, having dead air spaces or chambers 34, 34,—Figs. 1 and 2,—and is also provided with double or hollow sides and ends, the said side walls forming vertical air flues 18, as clearly illustrated in Fig. 2. Air flues 18 communicate at their upper ends with inwardly-extending flues or passages 37, which latter open into a flue or passage 39 extending longitudinally of the car, in the roof, as shown in Figs. 1 and 2. Above the flues 37, and communicating at their inner ends by means of guarded openings 12, are the air-chambers 30, through which the air escapes from the flues 18, 37 and 39, as indicated by the arrows in Fig. 2.

In order to admit air to the spaces or flues between the inner and outer side-shells, I employ either or both of two devices, according to circumstances.

Figure 5:
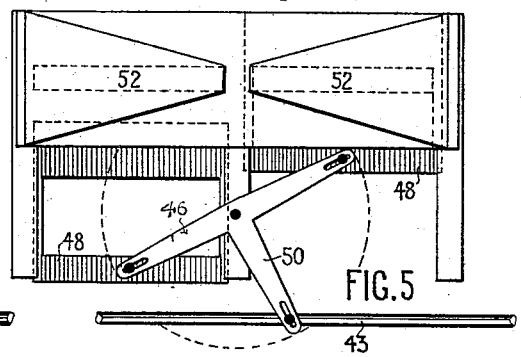
Figure 6:
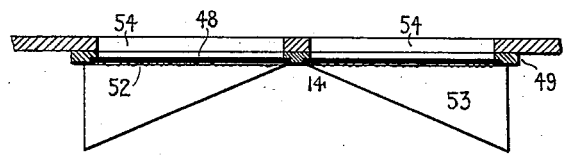
Figure 7:
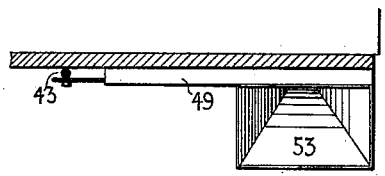
Figure 8:
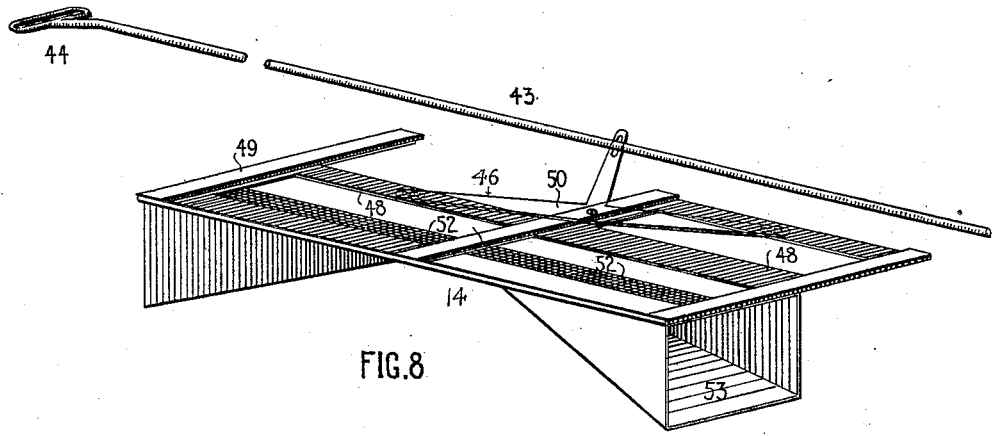

In Figs. 1 and 2 I show valved-openings or registers 15, seated in the sides of the car and adapted, when opened, to admit air through the outer side-shell into the flue. In these same figures I also show the double gathering funnels 14, which are located beneath the floor of the car to gather the air and force it into the flues or passages 18, whichever direction the car may travel; the said flues 18 being connected with the funnels 14 by a narrow throat or channel 13, indicated by dotted lines in Figs. 1 and 2. These funnels 14 are provided each with two gathering mouths or scoops 53, which open in opposite directions and which deliver the air through the screens 52 and the openings 54 into the flues or passages 13, 18. The alternately-acting scoops 53 are provided each with a valve, comprising an open sliding plate or frame 48, seated at its side edges in cleats or bars 49, and adapted to cut off communication between the scoops 53 and the respective openings 54, as shown in Figs. 3, 4, 5, 6, 7 and 8. In order to actuate the valve 48, I employ a pivoted T-shaped lever 50, whose lateral arms 46 have a loose connection with the valves, as shown in Fig. 5. When the lever 50 is brought to the position shown in full lines in Fig. 3, and also in Fig. 4, both valves 48 will close the openings 54 and prevent the entrance of air; but by throwing the lever to one side or the other of its central position, see Figs. 3, 5 and 8, one or the other of the valves will be opened. There will be a number of these funnels 14, and in order that all them on each side of the car may have their valves adjusted simultaneously, I connect the handles of the levers 50 with a rod or bar 43 carrying at its end a hand-hold or eye 44, so that by moving said rod lengthwise the valves may be properly set, as desired.

From the foregoing description it will be seen that the ice chamber and the storage chamber are each surrounded by an air space or chamber through which there is a constant circulation of air; and that, by means of the valved openings or registers 15 in the sides, and the valves 48 beneath the floor, the circulation may be accurately controlled or stopped, as circumstances may require. The vertical chamber or air space in the sides preferably communicates with the corresponding passages 18 at the ends the car.

At one end of the car there is a second upright air space or chamber 3, which, by means of the screened or guarded openings 31 at the base of said chamber, delivers air into the lower part of the refrigerating chamber 20. In this chamber 20 is placed the ice rack 9, drip pan 8, and water-discharge 7,—the latter extending into the air flue 3 to deliver the water into a water-tight box or tank 5, located at the base of the flue and provided with overflow pipe 16, as shown in Fig. 1. The air inlet to this chamber is closed by a valve 2, which is hinged or pivoted to the lower end of a stationary pipe 10,—see Figs. 1 and 2 and 9 to 13,—of the roof vent or cowl. This valve 2 is controlled by means of a rockshaft 17 extending out through the end of the car where it is provided (see Fig. 1) with an operating rod 29. When the valve is closed no air can pass down into the flue or passage 3 and into the chamber 20 beneath the ice. The stationary pipe 10 before referred to is provided with an opening in one side which is designed to be closed by a hinged valve 11, which latter, as shown in Figs. 2, 9 and 10, is operated by means of a rock-shaft 33 and a rod 32. When the valve 11 is opened and the valve 2 closed, the air that enters the pipe 10 will be delivered into the ice chamber 20 above the ice; but if both valves be opened, the air will be delivered both above and below the ice, as indicated by the arrows in Fig. 1.

The upper end of the pipe 10 is made cylindrical or provided with a cylindrical section upon which is mounted the rotatable head or scoop 57, which has its mouth screened and which is also provided with a vane 58 which keeps the mouth toward the wind no matter in what direction the car travels. This scoop or head 57 is mounted upon an upright spindle or shaft 55, journaled in suitable bearings or supports in the pipe 10, as shown in Fig. 13, an oil cup 56 being provided (see Figs. 13 and 14) for the purpose of keeping the principal bearing properly lubricated. At the opposite end of the car there is a roof-discharge vent similar in all respects to that just described, except,—as will be seen upon reference to Figs. 11, 12 and 13,—that the vane 58 is so placed upon the rotatable head piece 57 as to retain the mouth of the latter away from the wind regardless of the direction of travel of the car, and that the valve 11 is omitted. From this it will be seen that there is at one end of the car an inlet vent into and through which the air passes into the car, and at the opposite end a discharge vent through and from which the air from within the car passes out; and it will also be noticed that no matter in which direction the car travels, these vents will always perform their respective functions of introducing and discharging air. By this arrangement I am enabled to use but one ice box or chamber, and to be sure of a current of cold air always being carried through the car from one end to the other regardless of the direction of travel, as the receiving or inlet vent always insures the entrance of the air at that end in which the ice box or chamber is located.

It is of course to be understood that the chamber 20 in which the ice box is located, and into which the air is discharged through the receiving vent, communicates with or opens into the storage chamber or main body of the car, so that the air delivered through the revolving roof-vent will be caused to pass through the storage chamber, among the fruit, and will be discharged through the roof vent at the opposite end of the car. The roof vents open into the space between the main roof and the false roof so as to receive air as free as possible from cinders,—the roof being cut away round the said vents in order that they may turn or revolve.

In the transportation of fruits and other perishable freight, it is highly important that the temperature of the car be kept uniform; but, generally, this has been neglected, because there was no provision for ascertaining the temperature, to determine the necessity for variation of the latter. The main car-doors are of course accessible, but as they are sealed before starting, they must be delivered to the consignee with the seals unbroken, thereby rendering observation of the temperature by this means impracticable. To remedy this, I form in the side of the car a small opening 21 and fit therein a door 23 carrying on its inner face a thermometer 24, as shown in Figs. 1 and 2. The door is held closed by means of the hasp 28, staple 27, and pin 26. 25 is a handle by means of which to open the door. In order to prevent the fruit or other freight from being thrown against and breaking the thermometer, which projects into the interior of the car, I guard the opening 21 with bars 22, shown in Fig. 1. A frame or casing will be fitted into the opening 21 so as to prevent the air current in the hollow wall from interfering with or being interfered with by the current of air within the storage chamber, the door being, of course, of a thickness equal to the thickness of the car sides and the intervening space.

From the foregoing it will be seen that by opening this small door 23 the temperature of the storage chamber can be instantly determined by the thermometer 24 carried by the door; and it will also be observed that by reason of the small door employed, and the proper guarding or barring of the opening by means of the bars 22, there can be no abstraction of the contents of the car.

As before stated, it frequently becomes necessary in going extended journeys in which decided changes in temperature are encountered, to heat the car; and to do this cheaply and quickly, I provide the car with an opening 39 in its side, as shown in Figs. 15, 16 and 17, and fit into such opening a door 59, carrying on its inner face a stove or heater 60, adapted for burning charcoal or such other fuel as emits no appreciable smoke during combustion. This opening will also be guarded by bars 61, and the door will be provided with suitable means for locking it.

While ordinarily two of the roof vents will be found sufficient, the number of such vents may be increased as desired.

Having thus described my invention, what I claim is—

1. In a refrigerator car, a storage chamber; an ice chamber; the hollow sides containing air flues 18 which open outside the car at the top; an air inlet flue 13 provided with funnels beneath the car floor to direct the air into the lower end of the flues 18; and valved openings 15 in the hollow sides to admit air into said flues 18.

2. In a refrigerator car, a storage chamber; an ice chamber; the air flue 3 communicating at the lower end with the refrigerating chamber; and the air inlet pipe to supply air to the flue 3, and provided with two valves,—2 and 11,—the former controlling the admission of air into the flue 3 and the latter controlling the admission of air into the top of the ice chamber.

3. In a refrigerator car, a storage chamber; an ice chamber; the hollow walls or sides; the horizontal flues 37 communicating at their outer ends with the hollow walls; a longitudinal flue 39 communicating with the inner ends of the flues 37; and the horizontal flues 30 communicating at their inner ends with the flue 39 and open at their outer ends.

4. In a refrigerator car, an air flue having at its mouth two openings 54, 54; the double mouthed funnels 14 applied to the said openings; and two valves 48 connected so as to act simultaneously, for controlling respectively the admission of air to said openings.

5. In a refrigerator car, the gathering funnels; a reciprocating valve 48; and the T-shaped actuating lever 50.

6. In a refrigerator car, the hollow walls containing the air flue 18; the flues 13 opening into the said flue at different points throughout the length of the car and provided at their mouths with two openings 54, 54; funnels 14 applied to the flues 13; valves 48 controlling the admission of air through the openings 54; the lever 50 connected with each pair of valves; and an actuating rod 43 connected with the respective levers 50.

In witness whereof I hereunto set my hand in the presence of two witnesses.

HENRY B. PLANT.

Witnesses:
R. B. SMITH,
F. DE C. SULLIVAN.